United States Patent
Kumaki

(10) Patent No.: US 6,816,550 B2
(45) Date of Patent: Nov. 9, 2004

(54) IMAGE SIGNAL CODING APPARATUS WITH BIT STREAM BUFFER OF REDUCED STORAGE CAPACITY

(75) Inventor: Satoshi Kumaki, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 663 days.

(21) Appl. No.: 09/784,064

(22) Filed: Feb. 16, 2001

(65) Prior Publication Data

US 2001/0026585 A1 Oct. 4, 2001

(30) Foreign Application Priority Data

Mar. 29, 2000 (JP) ........................................ 2000-091014

(51) Int. Cl.⁷ ................................................ H04B 7/66
(52) U.S. Cl. ................................................ 375/240.03
(58) Field of Search ....................... 375/240.01, 240.23, 375/240.25, 240.26, 240.08, 240.27, 240.03; 714/244, 701, 775; 370/244; H04B 1/66

(56) References Cited

U.S. PATENT DOCUMENTS 5,574,717 A * 11/1996 Tomizawa et al. .......... 370/244
5,862,153 A * 1/1999 Kikuchi et al. ............. 714/775
6,571,361 B1 * 5/2003 Kikuchi et al. ............. 714/701

FOREIGN PATENT DOCUMENTS

| JP | 9-298748 | 11/1997 |
| JP | 11-234671 | 8/1999 |
| JP | 11-251922 | 9/1999 |

OTHER PUBLICATIONS

"Video Buffer Verifier", H Series Recommendation (rev. 1998), Published by Juridical Foundation The ITU Association of Japan, Apr. 30, 1998, pp. 580–583.

* cited by examiner

Primary Examiner—Tung T. Vo
(74) Attorney, Agent, or Firm—McDermott Will & Emery LLP

(57) ABSTRACT

The number of stuff bytes to be inserted is calculated using a stuff code inserter in a difference detection circuit, inserted as a stuff code into a bit stream of coded data and stored into a bit stream buffer. The stuff code is detected in a multiplexed bit stream read out from the bit stream buffer, read of a coded bit stream is ceased and stuff bytes indicated by the stuff code are inserted into the coded bit stream. Therefore, stuff bytes generated in great amount can be easily inserted into an output bit stream even with a small data transfer capacity of the bit stream buffer.

11 Claims, 13 Drawing Sheets

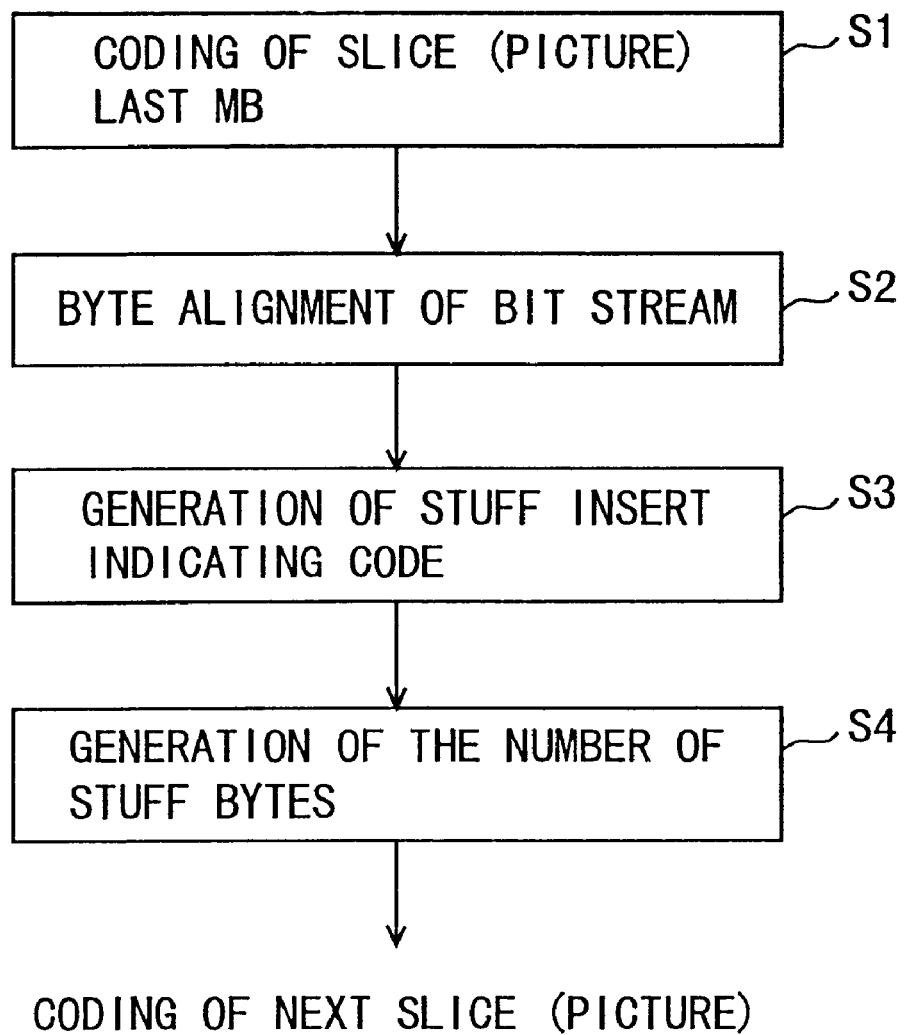

FIG. 3A
|← BYTE →|
0 0 0 0 0 1 1 0
1 0

FIG. 3B 0 0 0 0 0 1 1 0
1 0 0 0 0 0 0 0   "0" FILLING FOR
                  BYTE ALIGNMENT

FIG. 3C 0 0 0 0 0 1 1 0
1 0 0 0 0 0 0 0
0 0 0 0 0 0 0 0
0 0 0 0 0 0 0 0
0 0 0 0 0 0 0 1   STUFF INSERT,
1 1 0 0 0 0 0 0   INDICATING CODE INSERTION,
0 0 0 0 0 0 0 0
1 1 1 1 1 1 1 1   STUFF CODE INSERTION

FIG. 3D 0 0 0 0 0 1 1 0
1 0 0 0 0 0 0 0
0 0 0 0 0 0 0 0
0 0 0 0 0 0 0 0
0 0 0 0 0 0 0 1
1 1 0 0 0 0 0 0
0 0 0 0 0 0 0 0
1 1 1 1 1 1 1
0 0 0 0 0 0 0 0
0 0 0 0 0 0 0 0   BIT STREAM OF NEXT
0 0 0 0 0 0 0 1   SLICE (PICTURE)
0 0 0 0 0 0 0 0

F I G. 4
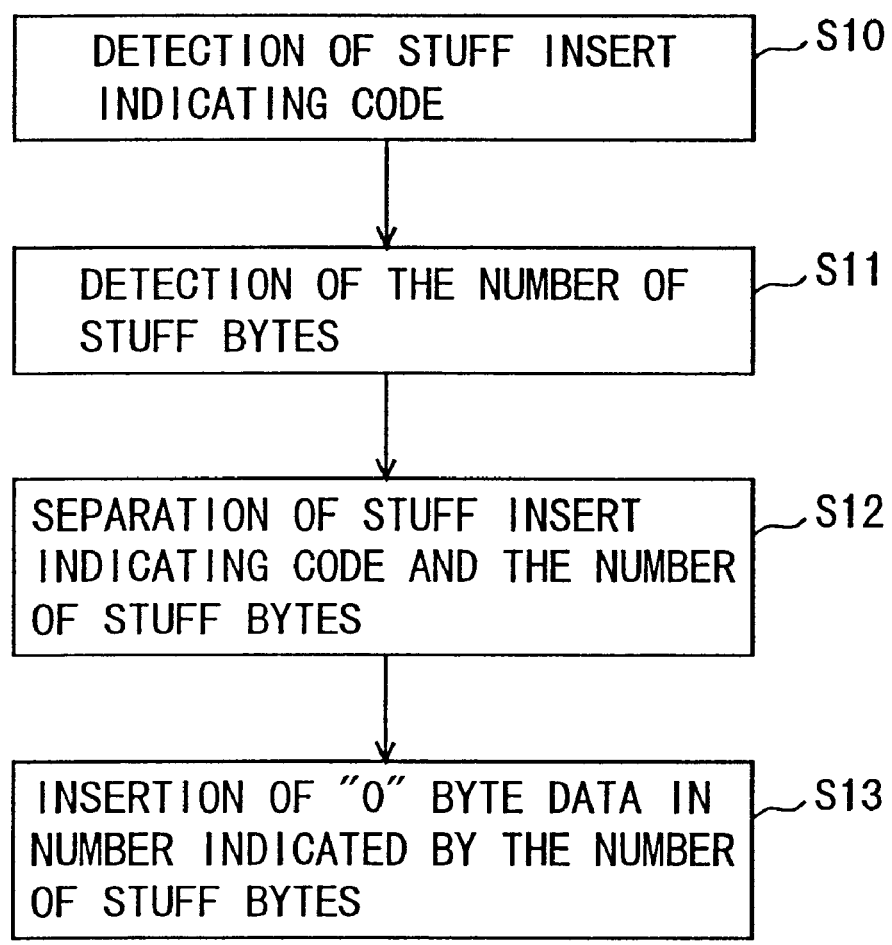

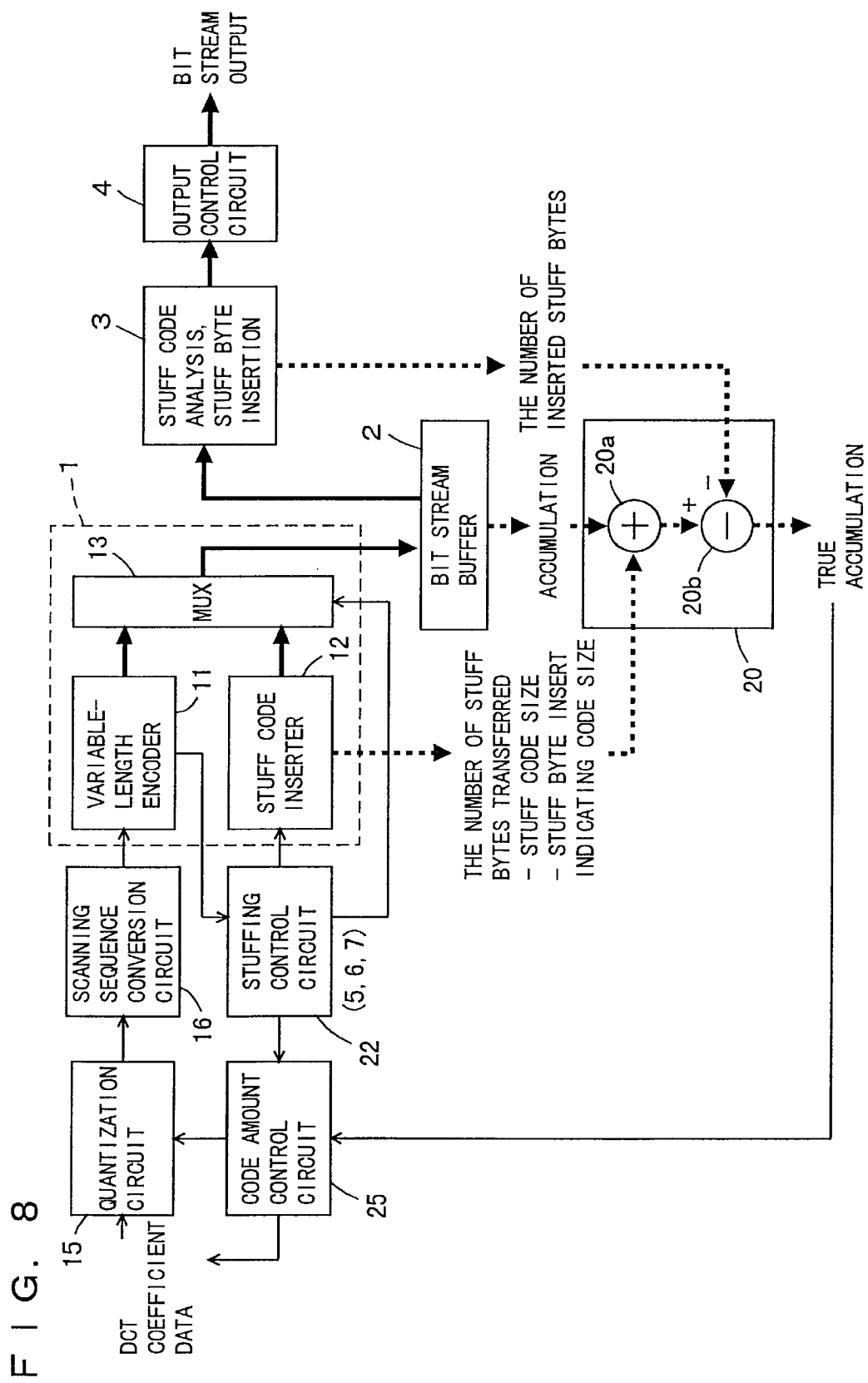

"0" FILLING FOR BYTE ALIGNMENT

THE NUMBER OF INSERTED STUFF BYTES, FLAG BIT IS SET TO "1"

BIT STREAM OF NEXT PICTURE

IMAGE SIGNAL CODING APPARATUS WITH BIT STREAM BUFFER OF REDUCED STORAGE CAPACITY

BACKGROUND OF THE INVENTION

1. Field of the Invention

The present invention relates to an image signal coding apparatus and particularly, to a coding apparatus for encoding and outputting a moving image data in real time according to MPEG (Moving Picture Experts Group) standards.

2. Description of the Background Art

In general, compression processing according to MPEG 1 and MPEG 2 standards has been employed in order to encode a moving image data including a great amount of information efficiently. In the MPEG standards, processing is performed as follows: A picture of a field or a frame is divided into compression units called macroblocks. A macroblock of a reference picture having the highest correlationship with a macroblock of interest of a current picture is detected, difference values between corresponding pixels of the macroblocks having the highest correlationship are obtained and the difference values are encoded. In the MPEG standards, redundancy of moving image information and characteristics of a human visual organ are exploited, and redundant information and information unimportant in terms of a human visual characteristics are removed to compress moving image information. An amount of codes of digital information (a bit stream) obtained as a result of the compression varies to a great extent depending on characteristics of an input image, such as correlation degree between pictures (frames or fields) and an amount of high spatial frequency components, even under the same compression conditions. Therefore, an amount of codes resulting from the compression fluctuates even in one picture period. A target of an amount of codes is generally set for each picture (image), a compression parameter is controlled such that an amount of codes coincides with the target amount.

Coded image information have to be transmitted to a decoder through a transmission line. A bit stream buffer is used for transmitting a bit stream through a transmission line with a constant data transfer rate. In a period in which an amount of codes is great, a transmission amount is lowered by storing codes in excess of a transmission capacity in a bit stream buffer, while in a period in which an amount of codes is small, codes are read out from the bit stream buffer and transferred at a predetermined data transfer rate. Transmission of coded data at a constant transfer rate can be realized by smoothing of a data transfer rate through exploitation of a bit stream buffer.

FIG. 14 shows a configuration of an output section of a conventional moving image signal processing apparatus schematically. In FIG. 14, the moving image signal processing apparatus includes: a quantization circuit 901 receiving DCT (Discrete Cosine Transformation) coefficient data of a picture of a field or a frame in macroblock units and performing quantization thereof; a scanning sequence conversion circuit 902 converting a scanning order of DCT coefficient data quantized by the quantization circuit 901 according to a zigzag scanning method, for example; a variable-length coding circuit 903 performing variable-length coding of quantized data having the scanning order converted by the scanning sequence conversion circuit 902; a bit stream buffer 904 for storing variable-length codes from the variable-length coding circuit 903; and an output control circuit 905 reading out sequentially data stored in the bit stream buffer 904 and outputting the data at a constant data transfer rate. In the variable-length coding circuit 903, quantized DCT coefficient data from the scanning sequence conversion circuit 902 are subjected to variable-length coding, thus effecting compression of an information volume.

This image signal coding apparatus further includes: a code amount sum circuit 906 summing up an amount of codes, in macroblock units, generated by the variable-length coding circuit 903; and a rate control circuit 907 controlling an amount of generated codes by adjusting a quantizing scale of the quantization circuit 901 according to the sum from the code amount sum circuit 906. The rate control circuit 907 generally sets a target amount of codes to be generated in a following picture according to the sum of the code amount sum circuit 906 and adjusts a quantizing scale of the quantization circuit 901 such that an amount of codes generated actually in the following picture coincides with the target. The rate control circuit 907 adjusts an amount of generated codes in macroblock units such that an average of an amount of codes outputted from the variable-length coding circuit 903 coincides with a transmission rate on a transmission line through which a bit stream outputted from the output control circuit 905 is transmitted. This coding of one picture of a frame in macroblock units is carried out sequentially in one picture period of input images.

In coding of a picture (an image of a field or a frame), when an amount of codes does not reach a target, a byte data of "0" called as a stuff byte is generated and the stuff byte is added to a coded data such that an amount of generated codes of a picture coincides with a target. The term "stuffing" indicates an operation of inserting a stuff byte into a bit stream. The stuff bytes are discarded in decoding. A shortage of an amount of codes from a target can be filled up with stuff bytes with no adverse influence on a reproduced image.

This stuffing, in the MPEG 2 standard, can be performed in GOP (group of pictures) units, picture units or slice units and, in the MPEG 1 standard, can be performed in GOP units, picture units, slice units or macroblock units. Generally, stuffing is performed in picture units or sequence units in most cases. When stuffing is performed in macroblock units, a picture quality is degraded due to limitation of an amount of codes in each macroblock. For example, if stuffing is performed in picture units, an amount of codes can be allotted to individual macroblocks according to complexity thereof.

In a case of stuffing in picture units, the stuffing is performed after coding of one picture is completed and the sum of codes of the one picture is calculated.

FIGS. 15A and 15B are illustrations showing distributions in amount of stuff bytes and generated codes of macroblocks when an amount of coded data of one picture is close to a target schematically. As shown in FIG. 15A, stuff bytes are inserted after a region for placing coded data of one picture. When an amount of coded data of one picture is close to a target, amounts of codes in respective macroblocks, as shown in FIG. 15B, are large, but an amount of stuff bytes is small. When stuff bytes are inserted after a coded data store region for one picture, an amount of codes is summed in the code amount sum circuit 906 shown in FIG. 14 and stuff bytes are generated according to a result of the summing and stuff bytes generated are multiplexed with coded data to be written into the bit stream buffer 904. In this case, since a generation amount of stuff bytes is small, necessary stuff bytes can be generated and written in the bit stream buffer 904 with a sufficient margin.

FIGS. 16A and 16B are illustrations showing distributions of codes and stuff bytes when an amount of coded data of one picture is extremely small schematically. In FIG. 16, coded data of one picture are extremely small in amount. This phenomenon arises when a motion of a picture is extremely low in speed or amount in a prediction coding scheme. Since amounts of generated codes of macroblocks are small as shown in FIG. 16B, stuff byte tens of times as large as an amount of coded data of one picture are required to be generated.

Generation of the stuff bytes and a write operation thereof into the bit stream buffer 904 are executed in a period between pictures, for example in a vertical blanking period. In a case where a transmission rate of a bit stream is as high as several tens Mbps (bit/sec), an extremely large amount of stuff bytes are necessary to be inserted in order to transfer coded data in matching with the transmission rate. The bit stream buffer 904, however, is generally constructed of RAMs (Random Access Memories) and there is a limitation on a data transfer rate. Therefore, even in order to be adapted with a transfer rate of several tens Mbps, a data transfer capability of the bit stream buffer 904 is necessary to be sufficiently high so as to write a great amount of stuff bytes in the bit stream buffer 904, making the bit stream buffer 904 expensive. In another case, the bit stream buffer 904 cannot cope with this high data transfer capability requirement and a necessary amount of stuff bytes cannot be adequately inserted. Thus, it becomes impossible to smooth a data transfer rate, resulting in a problem such as processing failure in a decoder.

That is, since coding of picture data in one screen is sequentially carried out in one picture processing time, write operations of coded data on the bit stream buffer 904 are sequentially performed (the write operations are carried out in macroblock units). Since transfer of stuff bytes generated when coding of this one screen (one picture) is completed is executed after the completion of coding of the one picture, the stuff bytes are necessary to be generated and written at a higher rate than writing of coded data is. Therefore, a memory having a higher data transfer rate than necessary for smoothing a transfer rate of coded data is required to be used for the bit stream buffer 904 simply for the purpose of insertion of the stuff bytes, which entails use of a memory with a transfer rate higher than necessary, resulting in a problem of a cost of the coding apparatus being high.

SUMMARY OF THE INVENTION

It is an object of the present invention is to provide an image signal coding apparatus that can reduce a data transfer capability of a bit stream buffer memory.

It is another object of the present invention is to provide an image signal coding apparatus that can realize stuffing even with a memory having data transfer capability of the same level as an bit stream transfer rate.

It is still another object of the present invention is to provide an image signal coding apparatus that has no necessity of generating a great amount of stuff bytes in a short period.

It is yet another object of the present invention is to provide an image signal coding apparatus that can performs smoothing of data transfer in a correct manner with no overflow or underflow phenomenon even using a memory with a low data transfer capability as a bit stream buffer.

An image signal coding apparatus according to the present invention includes: bit stream generation circuitry for coding an image signal to generate a bit stream of coded image data; difference detection circuitry calculating the number of bits of coded image data for each predetermined processing unit section of a bit stream from the bit stream generation circuitry and obtaining a difference between the calculated number of bits and a predetermined reference number of bits; insertion circuitry generating a difference code indicating the difference detected by the difference detection circuitry and a stuff start code indicating an insertion position of the difference code, and outputting the bit stream to a bit stream memory after inserting the difference code and the stuff code into the processing portion of the bit stream; output circuitry extracting a stuff start code and a difference code from a bit stream read out from the bit stream memory and inserting stuff bits of the number indicated by the difference code into a corresponding processing unit section in accordance with the stuff start code and the difference code extracted, starting at a position indicated by the stuff start code, to output the bit stream with the inserted stuff bits; addition circuitry adding up an amount of data bits written in the bit stream memory and an amount of data bits indicated by the difference code; and subtraction circuitry subtracting an amount of stuff bits inserted by the output circuitry from an output value of the addition circuitry, to output a result of the subtraction when a difference code is extracted by the output circuitry.

The subtraction circuitry preferably further includes a circuit for subtracting an amount of data bits of a difference code and a stuff start code from an output value of the addition circuitry.

The stuff start code, in an aspect of the present invention, is a flag attached to a difference code and by this flag, a corresponding code can be identified as a difference code.

An image signal coding apparatus according to another aspect of the present invention includes: bit stream generation circuitry for coding an image signal to generate a bit stream of coded image data; difference detection circuitry calculating the number of bits of coded image data for each predetermined processing unit section of a bit stream from the bit stream generation circuitry and obtaining a difference between the calculated number of bits and a predetermined reference number of bits; insertion circuitry generating a difference code indicating a difference detected by the difference detection circuitry, outputting the coded image data with a flag of a first logic state linked thereto, to a bit memory, in a unit of a predetermined number of bits in parallel and outputting the difference code with a flag of a second logic state different from the first logic state linked thereto to the bit memory, in the unit of the predetermined number of bits in parallel; and output circuitry extracting a difference code according to a flag from a bit stream read out from the bit stream memory and inserting stuff bits by the number indicated by the difference code in a corresponding processing unit section in accordance with the difference code extracted, starting at a position indicated by a flag to output the bit stream with the inserted stuff bits.

An image signal coding apparatus according to a still another aspect of the present invention includes: bit stream generation circuitry for coding an image signal to generate a bit stream of coded image data; difference detection circuitry calculating the number of bits of coded image data for each predetermined processing unit section of a bit stream from the bit stream generation circuitry and obtaining a difference between the calculated number of bits and a predetermined reference number of bits; insertion circuitry generating a difference code indicating a difference detected by the difference detection circuitry and a stuff insert position indicating code indicating an inserting position of the difference code and generating a multiplexed bit stream by inserting the difference code and the stuff insert position indicating code into a corresponding processing unit section; a bit stream memory for storing a bit stream generated by the insertion circuitry; output circuitry extracting a difference code from a bit stream read out from the bit stream memory and inserting stuff bits by the number indicated by the difference code in a corresponding processing unit section in accordance with the difference code extracted, starting at a position indicated by the stuff insert position indicating code, to output the bit stream with the inserted stuff bits.

In the bit stream memory, stuff bits (stuff bytes) are not stored, but a difference code indicating the number of stuff bytes (bits) is stored. Therefore, there is neither a need to generate a great amount of stuff bits in a short time nor a need of a high transfer rate bit stream memory. Further, there is no need to generate a great amount-of stuff bits in a short time and even when an amount of generated codes is different according to characteristics of a picture, a bit stream memory can cope with such the situation correctly. Further, when a bit stream is transferred to a decoder, stuff bits are actually inserted according to a difference code, whereby the bit stream can be surely transferred at a constant data transfer rate.

Further, with a difference code, stuff bits are virtually stored in the bit stream memory and, by detecting a stored data amount of the bit stream memory when stuff bits were really stored in the bit stream memory, an amount of generated codes can be adjusted in a similar manner to a case where stuff bits are actually stored in the bit stream buffer memory.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flow chart representing operations of a bit stream generation section shown in FIG. 1;

FIGS. 3A to 3D are illustrations representing detailed operations of the bit stream generation section shown in FIG. 1;

FIG. 4 is a flow chart representing operations of a bit stream reforming section shown in FIG. 1;

FIG. 8 is a block diagram showing a main part of an image signal coding apparatus according to the second embodiment of the present invention;

DESCRIPTION OF THE PREFERRED EMBODIMENTS

First Embodiment

Figure 1:
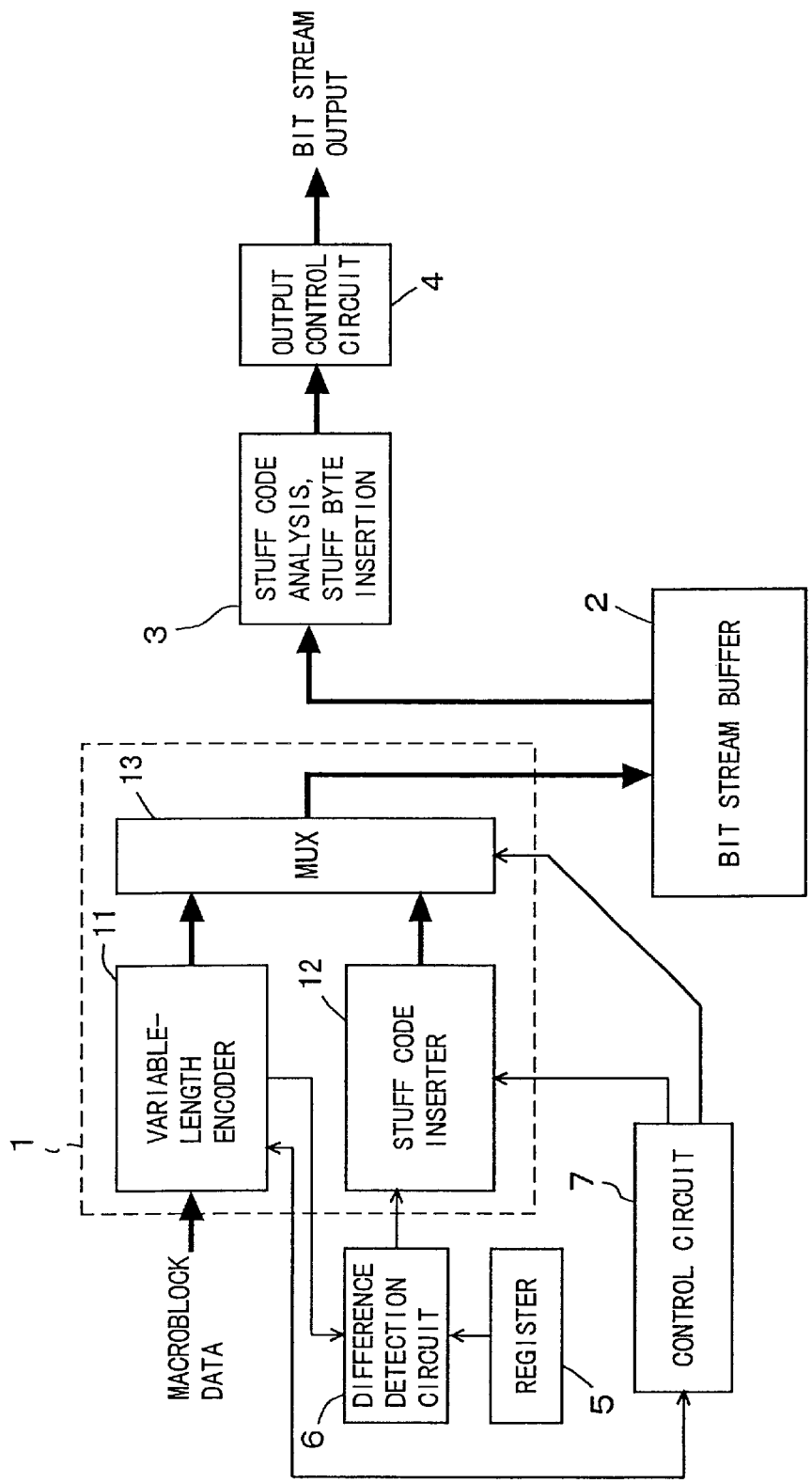
FIG. 1 is a block diagram schematically showing a configuration of a main part of an image signal coding apparatus according to a first embodiment of the present invention.

FIG. 1 is a block diagram schematically showing a configuration of a main part of an image signal coding apparatus according to a first embodiment of the present invention. In FIG. 1, the image signal coding apparatus includes: a bit stream generation section 1 receiving coded data of macroblocks to generate a bit stream; a bit stream buffer 2 storing and reading out a bit stream generated by the bit stream generation section 1; a bit stream reforming section 3 detecting and analyzing a stuff code from data read out from the bit stream buffer 2 and based on a result of the analysis, inserting stuff bytes in the bit stream; and an output control circuit 4 outputting the bit stream generated by the bit stream reforming section 3 at a constant transfer rate.

The bit stream generation section 1 includes: a variable-length encoder 11 receiving, for example, quantized DCT coefficient data subjected to scanning sequence conversion to convert a quantized DCT coefficient of a macroblock to a variable-length code in macroblock units; a stuff code inserter 12 inserting a stuff code in codes of a unit processing section; and a multiplexer (MUX) 13 selecting one of outputs of the variable-length encoder 11 and the stuff code inserter 12 and providing the one to the bit steam buffer 2 as a bit stream. Variable-length encoder 11 is of a configuration similar to a conventional one.

The stuff code inserter 12 does not generate stuff bytes (stuff bits) but a stuff code indicating the number of stuff bits to be inserted (since, in the first embodiment, stuff bits are inserted in byte units (a unit of a byte), the stuff bits are hereinafter referred to simply as stuff bytes) and further, generates a stuff insert indicating code indicating a position at which a stuff code is inserted.

The multiplexer 13 inserts (multiplexing) a stuff insert indicating code and a stuff code from the stuff code inserter 12 after a bit steam of coded data of a picture from the variable-length encoder 11 and supplies a multiplexed bit stream to the bit stream buffer 2.

In order to control operation of the stuff code inserter 12, there are provided a difference detection circuit 6 calculating an amount of codes generated by the variable-length encoder 11 and detecting a difference from a target code amount, for example, in picture units of a processing unit section stored in a register 5; and a control circuit 7 detecting the last position of codes of one picture in a processing unit section of the variable-length encoder 11 and controlling operations of the stuff code inserter 12 and the multiplexer 13.

Completion of one picture processing is detected by, for example, counting the number of macroblocks. The difference detection circuit 6 calculates an amount of codes generated in one picture by accumulating amounts of codes in macroblock units. Here, while a picture is used as a processing unit section, if a layer such as GOP and sequence, in which the stuff bytes are allowed to insert, is available, the present invention can be applied to the layer. Here, a picture is simply employed as an example of a processing unit section.

Therefore, from the bit stream generation section 1, a bit stream of image signal codes, a stuff code indicating the number of stuff bytes to be inserted at a termination section of the picture, and a stuff insert indicating code indicating an inserting position of the stuff code are multiplexed and supplied to the bit stream buffer 2.

When the bit stream reforming section 3 detects a stuff insert indicating code from a multiplexed bit stream read out from the bit stream buffer 2, then the section 3 analysis a stuff code associated and transferred along with the stuff insert indicating code and inserts stuff bytes by the number indicated by the stuff code in the bit stream, starting at a position of the stuff insert indicating code. The bit stream buffer 2 has a structure of First-In, First-Out. The output control circuit 4 outputs a reformed bit stream generated by the bit stream reforming section 3 at a predetermined transmission rate.

FIG. 2 is a flow chart representing operations of a bit steam generation section 1 shown in FIG. 1. Now, with reference to FIG. 2, description will be given of operations of the bit stream generation section 1 shown in FIG. 1. In FIG. 2, a coded image signal is shown in a case of a slice or a picture employed as a processing unit section.

A coded image signal (a DCT coefficient data) subjected to a scanning conversion operation such as zigzag scanning or an alternate scanning is supplied to the variable-length encoder 11. In the variable-length encoder 11, when coding of the last macroblock (MB) of a slice (or a picture) of a processing unit section is completed (step S1), then alignment of output bytes of the variable-length encoder 11 is performed (step S2).

In the byte alignment, variable-length codes from the variable-length encoder 11 are grouped in byte units. When there arises an empty space in a byte region of the last variable code, "0" is inserted there. After completion of the byte alignment, a data indicating a difference (in byte units) from a target, detected by the difference detection circuit 6, is supplied to the stuff code inserter 12. The stuff code inserter 12, firstly, generates a stuff insert indicating code (step S3) and then generates a stuff code indicating a difference detected by the difference detection circuit 6. The stuff code indicates the number of stuff bits to be inserted in byte units.

After the multiplexer 13 outputs a code of the last macroblock (MB) from the variable-length encoder 11, the multiplexer 13 selects a stuff insert indicating code and a stuff indicating code from the stuff code inserter 12 and supplies the codes to the bit stream buffer 2. Thereafter, the multiplexer 13 is again set to the state of selecting a variable-length code from the variable-length encoder 11 by the control circuit 7.

Therefore, the stuff insert indicating code and the stuff indicating code are only inserted (multiplexed) into a bit stream following variable-length codes and then supplied to the bit stream buffer 2. Hence, there is no need to insert stuff bytes for adjustment of an amount of generated codes and even in a case where an amount of generated codes in a picture is small, the stuff insert indicating code and the stuff indicating code can be multiplexed into a bit stream of variable-length codes.

FIGS. 3A to 3D are illustrations representing detailed operations of the bit stream generation section 1. In FIGS. 3A to 3D, "000001C0 (H)" is used as a stuff insert indicating code and a 4 byte field is used as a field for a stuff code indicating the number of stuff bytes.

In FIG. 3A, a byte alignment on a variable-length codes from the variable-length encoder 11 is performed. In the byte alignment, positioning of full byte boundaries begins from the uppermost bit position.

Then, as shown in FIG. 3B, bits of "0" are inserted in an empty space of a byte of the last code. In a decoder, it is ruled that decoding generally begins at a byte boundary and therefore, even if "0" are filled for byte alignment, the inserted "0" are discarded in the decoder.

Then, after the byte alignment is performed, a difference in a byte unit between an amount of actually generated codes and a target amount is obtained and, as shown in FIG. 3C, there is inserted a stuff insert indicating code indicating that a stuff code is inserted at a position at which insertion of stuff bytes begins. While a field of 8 bytes is used, there is a need to use a code which is not present in a bit stream of a coded image signal as a stuff insert indicating code. For example, in syntax of a video coding scheme (video ES) of the MPEG 2 standard, "a code of 0000 01 (H)+8 bytes" is handled as "a start code" and the start code is prepared as a unique code that is not present in coded data. Of start codes, a code that is reserved for future expansion is used as a stuff insert indicating code. Further, since the stuff insert indicating code is used only in the interior of the encoder and discarded in the bit stream reforming section 3 as described later, therefore no trouble is caused on a coded bit stream that is output finally.

It should be noted that a stuff code region of 4 byte field is ensured for a stuff code indicating the number of stuff codes which is inserted following the stuff insert indicating code. The stuff code is "00FF (H)" in a case of FIG. 3C. The stuff code is set to a size that produces no empty space in byte alignment.

When generation of a coded bit stream from the variable-length encoder 11 is completed, the multiplexer 13 selects a stuff insert indicating code and a stuff code from the stuff code inserter 12 for sequential outputting. Therefore, as a bit stream supplied to the bit stream buffer 2, as shown in FIG. 3D, a bit stream of coded data, the stuff insert indicating code and the stuff code following the bit stream are multiplexed and transmitted sequentially. A bit stream of a slice (a picture) of the following processing unit section is supplied next to the stuff code. The start of a bit stream of the following slice (or picture) is identified by a slice (or picture) start code.

As shown in FIG. 3D, it is difficult to identify an inserting position of stuff bytes in a bit stream, different from in a case of a bit stream outputted from the variable-length encoder. By inserting a stuff insert indicating code, however, a stuff code and a stuff byte inserting position can be identified with ease.

FIG. 4 is a flow chart representing operations of a bit stream reforming section 3 shown in FIG. 1. Description will be made of operations of the bit stream reforming section 3 shown in FIG. 1 with reference to FIG. 4.

First, a bit pattern of a bit stream read out from the bit stream buffer 2 is analyzed and it is determined whether or not a stuff insert indicating code has been applied. If the stuff insert indicating code is detected (step S10), then, following the detection, a stuff code of a field of a predetermined byte width is analyzed and the number of inserted stuff bytes is detected (step S11). If the stuff insert indicating code and a stuff code are detected, then the stuff insert indicating code and the stuff code are separated from the bit stream (step S12).

Figure 5:
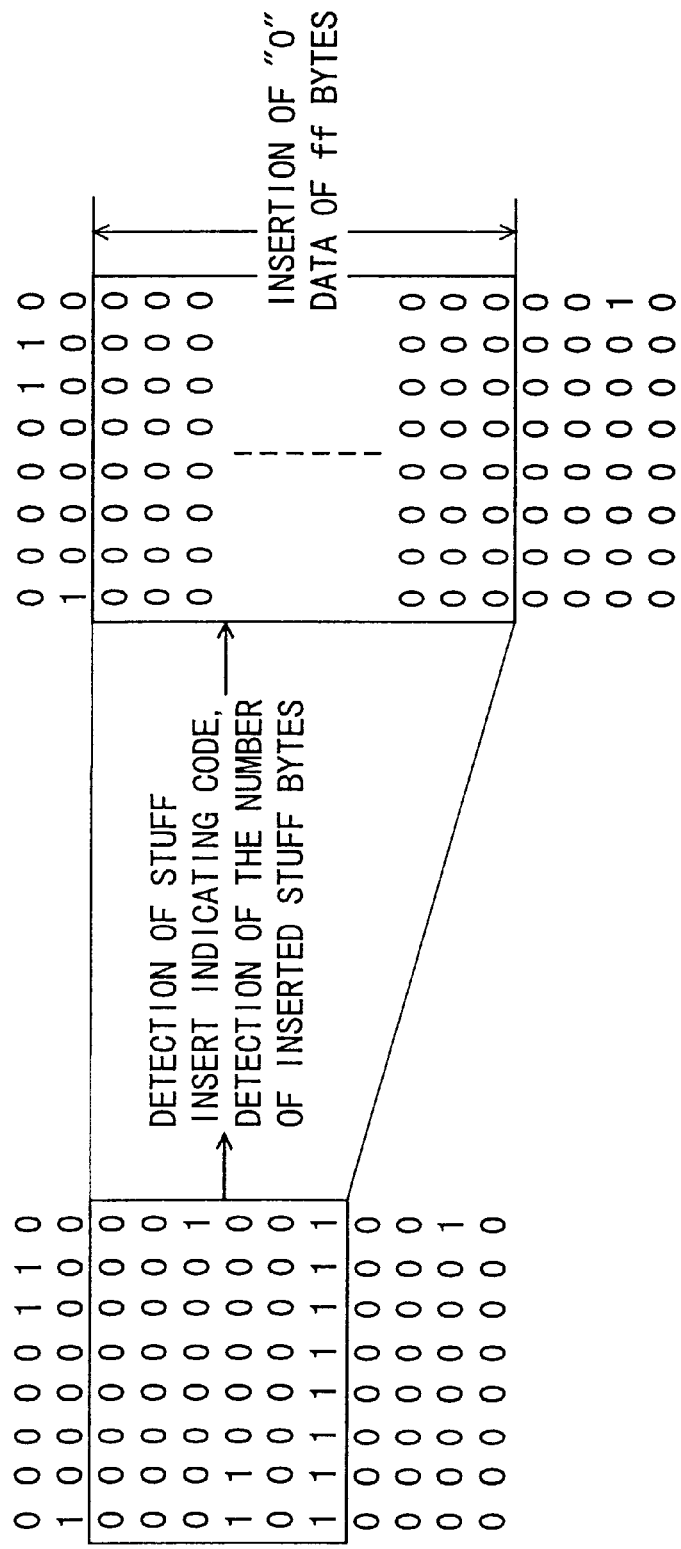
FIG. 5 is an illustration representing detailed operations of the bit stream reforming section shown in FIG. 1.

Then, as shown in FIG. 5, data of "0" bytes of the number of stuff bytes indicated by the stuff code is inserted at a position at which the stuff inert indicating code is inserted. Since the stuff code previously indicates "00FF" as the number of stuff bytes, "0", data of bytes of FF(H) is inserted into the bit stream. When insertion of the stuff bytes is completed, a coded bit stream of a sequence (or a picture) of the following processing unit section is sequentially output subsequent to the insertion.

Therefore, in the bit stream buffer, "0" of the FF bytes are not necessary to store and then be read out, thereby enabling write/read of a bit stream at a comparatively slow rate. Further, the stuff insert indicating code has been inserted, a stuff byte inserting position can be identified in the bit stream with ease and further, the number of stuff bytes can be identified by the stuff code with ease.

Further, the stuff insert indicating code and the stuff code are discarded by the bit stream reforming section 3 and any of the stuffing codes is not included in a bit stream transmitted to a receiver section, whereby the codes exert no adverse influence on a reproduced picture.

Figure 6:
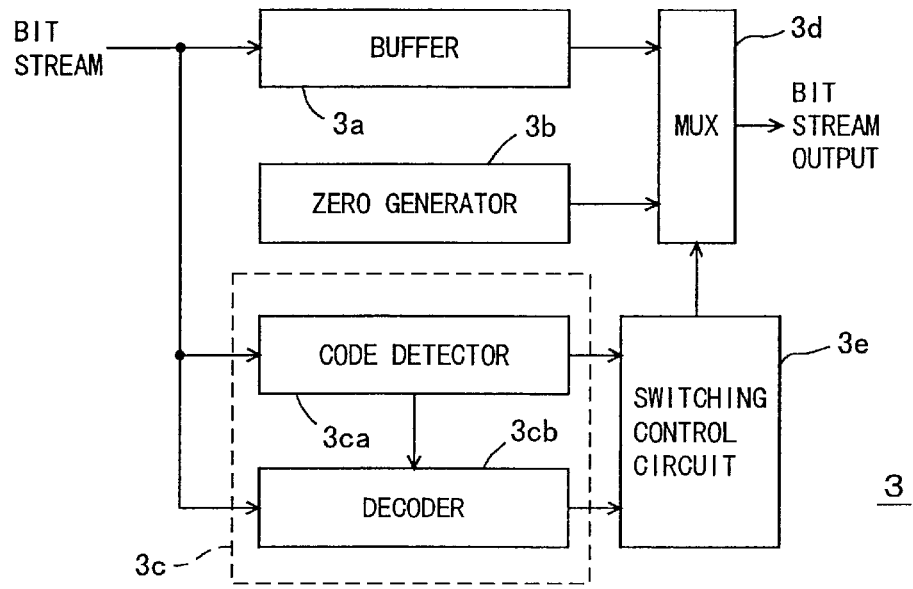
FIG. 6 is a block diagram schematically showing an example of configuration of the bit stream reforming section shown in FIG. 1.

While such processing in the bit stream reforming section 3 may be realized by means of a software, a hardware as shown in FIG. 6 may be adopted instead of the software.

FIG. 6 is a block diagram schematically showing an example of configuration of the bit stream reforming section 3 shown in FIG. 1. In FIG. 6, the bit stream reforming section 3 includes: a buffer 3a for processing a bit stream read out from the bit stream buffer; a zero generator 3b for generating "0" at all time; a code analyzer 3c for analyzing codes of the bit stream read out from the bit stream buffer; a multiplexer (MUX) 3d for selecting one of output bits of the buffer 3a and the zero generator 3b; and a switching control circuit 3e for switching selection routes of the multiplexer 3d according to an output signal of the code analyzer 3c.

The code analyzer 3c includes: a code detector 3ca for detecting a stuff insert indicating code; and a decoder 3cb activated in response to a code detection signal from the code detector 3ca, to decode a stuff code applied following the activation thereof for detecting the number of stuff bytes. The switching control circuit 3e sets the multiplexer 3d into a state of selecting an output of the zero generator 3b for a stuff byte inserting period according to the code detection signal from the code detector 3ca and number-of-stuff bytes information from the decoder 3cb.

The buffer 3a has a FIFO structure and outputs a bit stream in a received order. The zero generator 3b is constructed by, for example, a ground line and the like, and generates a "0" byte data.

In the code analyzer 3c, when code detector 3ca monitors the codes of a bit stream read out from the bit stream buffer, and when a stuff insert indicating code is applied, the code detector 3ca generates a detection signal to the decoder 3cb and the switching control circuit 3e. The switching control circuit 3e makes the multiplexer 3d select output bits (bytes) of the buffer 3a till the detection signal from the code detector 3ca is supplied. When receiving the detection signal from the code detector 3ca, the switching control circuit 3e makes the multiplexer 3d select output bits (byte) of the zero generator 3b. With the selection, the stuff insert indicating code and the stuff code are discarded from the bit stream outputted from the buffer 3a. Further, the buffer 3a is forced to cease reading of the bit stream from the bit stream buffer 2. When the decoder 3cb receives the detection signal from the code detector 3ca, the decoder 3cb decodes a stuff code provided following the detection signal to detect the number of stuff bytes.

The switching control circuit 3e makes the multiplexer 3d select output bits (bytes) of the zero generator 3b for a period of a detected number of stuff bytes. When a period specified by the decoder 3cb elapses, the switching control circuit 3e makes the multiplexer 3d select output bits (bytes) of the buffer 3a. Therefore, an output of bit stream from the multiplexer 3d is composed of coded data and stuff bytes of "0" data inserted therein, following the coded data. When the stuff bytes are terminated, coded data of the next slice (or picture) are selected and output by the multiplexer 3d. Detection of a stuff byte insertion period is achieved by, for example, counting transfer bytes or clock signals for bit stream transfer.

As described above, according to the first embodiment of the present invention, when a write operation is performed on the bit stream buffer, a stuff insert indicating code and a stuff code indicating the number of stuff bytes are written and what is required is to write a special code of a given size, independent of a magnitude in number of stuff bytes, thereby enabling exploitation of a memory with a small transfer capability as a bit stream buffer.

Second Embodiment

Figures 7A, 7B:
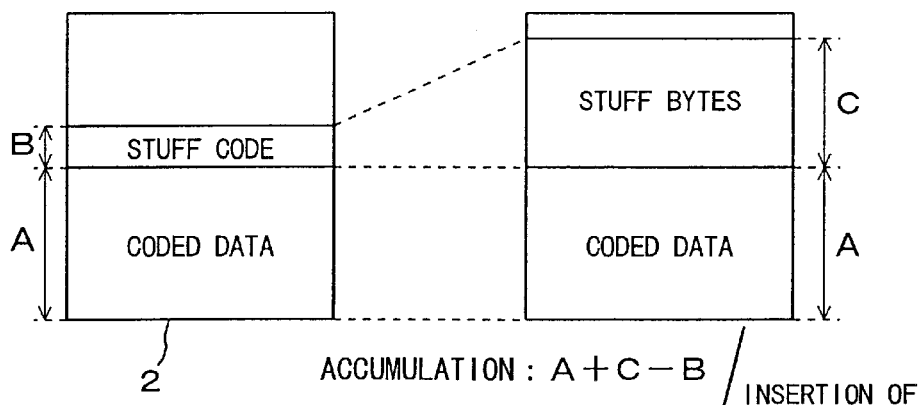
FIGS. 7A to 7C are illustrations showing examples of amounts of data accumulation in a second embodiment of the present invention.
Figure 7C:
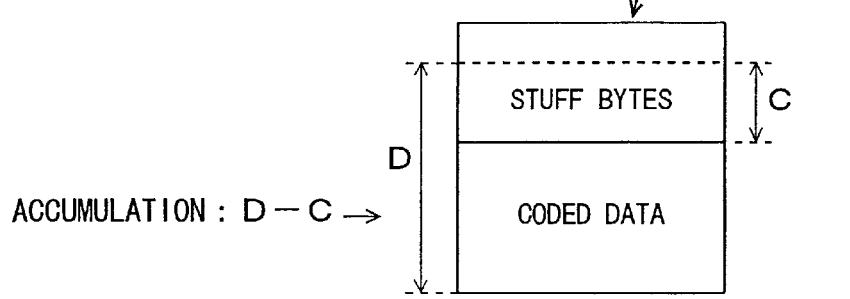

Now, assume that storage amounts for coded data and stuff codes (including a stuff insert indicating code and a stuff command for indicating the number of bytes) in the bit stream buffer 2 are A and B, respectively. In this case, an actual data accumulation amount of the bit stream buffer 2 is A+B. Stuff bytes to be inserted are virtually stored in the bit stream buffer 2 using the stuff code. Therefore, the accumulated data to be transmitted to a receiver side as an actual bit stream is the sum of coded data and stuff bytes as shown in FIG. 7B. Therefore, in this case, an accumulation amount of coded data to be transmitted is A+C−B.

On the other hand, when insertion of stuff bytes begins in the bit stream reforming section, then it means that the stuff bytes have all been read out from the bit stream buffer 2. Therefore, in this case, a byte-unit accumulation amount of coded data to be transmitted in the bit stream buffer 2 is a value obtained by subtracting the number C of the stuff bytes from an accumulation amount D at the time point as shown in FIG. C. The stuff codes have been read out in the accumulation amount D. That is, a subtraction by the stuff codes has been performed in the accumulation amount D and the accumulation amount of coded data to be transmitted that are accumulated in the bit stream buffer 2 is obtained only by subtracting the number of stuff bytes to be inserted from the current accumulation amount of the bit stream buffer 2. Therefore, an accumulation of codes to be transmitted of the bit stream buffer 2 takes a value of D−C on the insertion of stuff bytes and a value of A+C−B prior to the insertion of stuff bytes.

A true accumulation amount of coded data to be transmitted in the bit stream buffer 2 is detected and an amount of codes to be generated is adjusted. The bit stream buffer 2 is provided for transferring a bit stream at a constant transfer rate to the receiver side while on the receiver side, a video buffer verifier (VBV) is generally provided and a determination is performed by VBV on whether or not an underflow or overflow arises. In order to prevent the underflow or overflow on the receiver side from occurring, an amount of generated codes is adjusted according to a true accumulation amount of coded data in the bit stream buffer 2.

FIG. 8 is a block diagram schematically showing a main part of an image signal coding apparatus according to the second embodiment of the present invention. In FIG. 8, an image signal coding apparatus includes: an accumulation calculating circuit 20 calculating information indicating a true accumulation amount of codes in the bit stream buffer 2 based on information relating to a data accumulation of the bit stream buffer 2 and the number of transferred stuff bytes from the stuff code inserter 12, and information on the number of generated stuff bytes from the bit stream reforming section 3. A value obtained by subtracting a stuff code size (in byte units) and a size of a stuff byte insert indicating code (in byte units) from the number of transferred stuff bytes is applied to the accumulation calculating circuit 20 as number-of-transferred stuff bytes related information.

When the bit stream reforming section 3 detects a stuff code, the section 3 applies the data indicating the number of stuff bytes to be inserted according to a decoding result to the accumulation calculating circuit 20.

The accumulation calculating circuit 20 includes: an adder 20a adding accumulation information from the bit stream buffer 2 and the number-of-transferred-stuff-bytes related information from the stuff code inserter 12; and a subtracter 20b subtracting the number of inserted stuff bytes in the bit stream reforming section 3 from a result of the addition in the adder 20a. A true accumulation amount indicating an amount of coded data to be transmitted, stored in the bit stream buffer 2 is provided from the subtracter 20b.

The bit stream buffer 2 has, for example, a FIFO (First-In First-Out) structure and a data accumulation amount thereof is calculated based on a read address and a write address. A data accumulation amount prior to insertion of stuff bytes in the bit stream buffer 2 is calculated by the adder 20a. When data on the number of inserted stuff bytes is provided from the bit stream reforming section 3, the number of inserted stuff bytes is subtracted from an addition result in the adder 20a assuming that stuff bytes are all read out from the bit stream buffer 2.

A true accumulation amount data from the accumulation calculating circuit 20 is provided to a code amount control circuit 25. At a stage before the variable-length encoder 11, there are provided a quantization circuit quantizing a DCT coefficient data; and a scanning sequence conversion circuit 16 performing, for example, zigzag scanning or alternate scanning on quantized DCT coefficient data from the quantization circuit 15. In FIG. 8, the difference detection circuit 6, the register 5 and the control circuit 7 shown previously in FIG. 1 are represented as a stuffing control circuit 22.

Data on each code amount data in macroblock units and a generated code amount in a processing unit section (a slice or a picture) are supplied from the stuffing control circuit 22 to the code amount control circuit 25. The code amount control circuit 25 performs processings such as control of a quantizing scale of the quantization circuit or cease of DCT coefficient data generation to adjust a generated code amount based on a true accumulation amount indicating data from the accumulation amount calculating circuit 20 and a generated code amount data in each processing unit section from the stuffing control circuit 22. Therefore, since the code amount control circuit 25 uses a true accumulation amount indicating data from the accumulation amount calculating circuit 20, coding control similar to that when stuff bites are stored in the bit stream buffer 2 can be performed.

Figure 9:
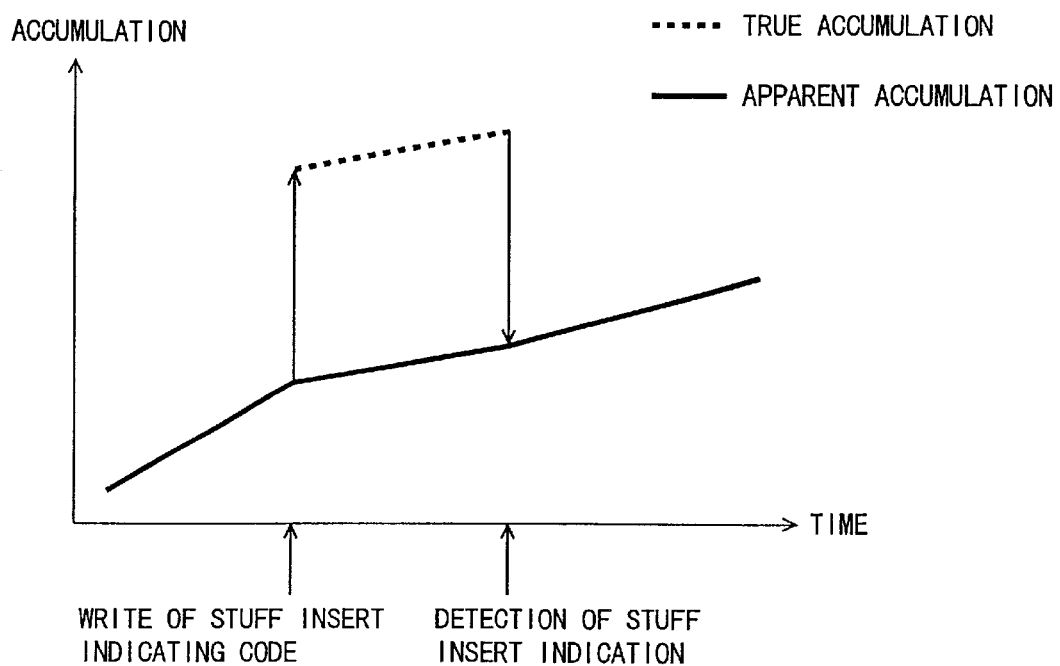
FIG. 9 is a graph showing an example of a change of an accumulation amount in a bit stream buffer over time in the second embodiment of the present invention.

FIG. 9 is a graph schematically showing a relation between a true accumulation amount and an apparent accumulation amount in the bit stream buffer 2. Coded data are gradually stored in the bit stream buffer 2 with time. When coding in a processing unit section such as one slice or one picture is completed, writing of a stuff insert indicating code and a stuff code is carried out. The stuff insert indicating code and the stuff code each have a predetermined size (in byte units). When the number of stuff bytes to be inserted is large, an accumulation of a bit stream to be transmitted, stored in the bit stream buffer 2 increases rapidly according to the number of stuff bytes indicated by a stuff code. Thereafter, a bit stream of coded data of the next processing unit section (a slice or a picture) is stored into the bit stream buffer 2 and then from the bit stream buffer 2, stored coded data are sequentially read out.

When a stuff insert indicating code is detected in the bit stream reforming section 3, analysis of a stuff code is performed and the stuff code is inserted following the detection. This state corresponds to a state where stuff bytes stored in the bit stream buffer 2 have all been read out and transferred to the bit stream reforming section 3. Therefore, in detection of a stuff code, an apparent accumulation amount and a true accumulation amount of coded bit streams coincide with each other. When a true accumulation amount is exploited to suppress a generated code amount by the code amount control circuit 25, an overflow or underflow of each of the bit stream buffer 2 and VBV on the receiver side can be prevented from being generated.

It should be noted that in the configuration shown in FIG. 8, the code amount control circuit 25 performs cease of DCT coefficient generation and adjustment of a quantizing factor of the quantization circuit 15. In order to adjust a generated code amount, however, such a processing may be performed that a quantization value from the quantization circuit 15 is set to a minimum (a size (the number of bits) generated by the variable-length encoder is set to the minimum).

Further, when a size of a stuff code is small enough to be neglected without a problem, only addition and subtraction on the number of stuff bytes may be performed.

As described above, according to the second embodiment, since a true accumulation amount of coded data of the bit stream buffer 2 is obtained at all times, coding control can be performed without any disadvantage in a scheme in which stuff bytes are encoded and stored into the bit stream buffer 2, as compared with a scheme in which stuff bytes are accumulated directly in the bit stream buffer 2 as in a conventional case.

Third Embodiment

Figure 10A:
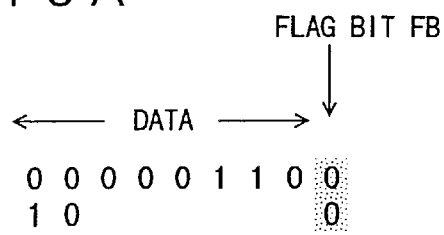
FIGS. 10A to 10D are illustrations representing an example of operations of a bit stream generation section according to a third embodiment of the present invention.

FIGS. 10A to 10D are illustrations representing operations of a bit stream generation section of an image signal coding apparatus according to a third embodiment of the present invention. As shown in FIG. 10A, a flag bit is attached (Linked) to a coded data. In a case of a coded data, a flag bit is set to, for example, "0."

Figure 10B:
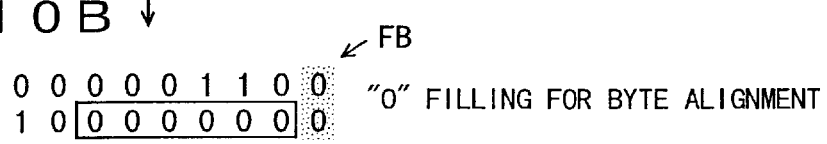

An empty space of an output code of the variable-length encoder is filled with "0" for byte alignment as shown in FIG. 10B. In this case as well, data are coded image data and flag bits are all set to "0."

Figure 10C:
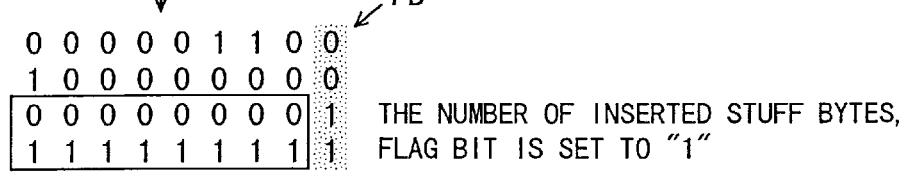
Figure 10D:
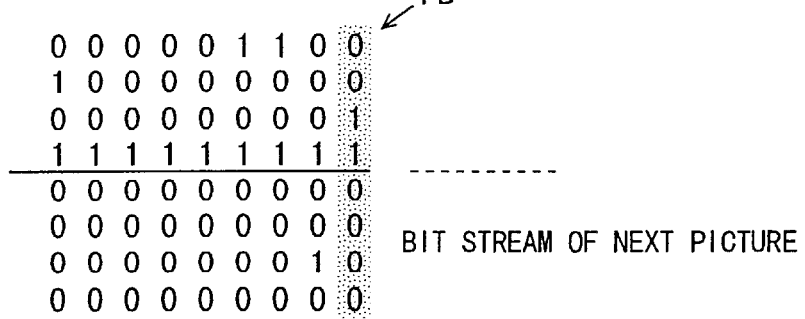

A stuff code indicating the number of inserted bytes is inserted following the coded data as shown in FIG. 10C and a flag bit FB is set to "1" in order to indicate that an associated data is a stuff code. In this state, an image data is stored into the bit stream buffer as a bit stream. Then, as shown in FIG. 10D, coded data of a bit stream of a picture of the next processing unit section (or a slice) are output as a bit stream. A flag bit FB of each coded data is set to "0" in order to indicate that an associated data is a coded data.

When the flag bit FB is used, it is easy to discriminate whether or not a code is a stuff code, based on "0" or "1" of a flag bit FB.

Figure 11:
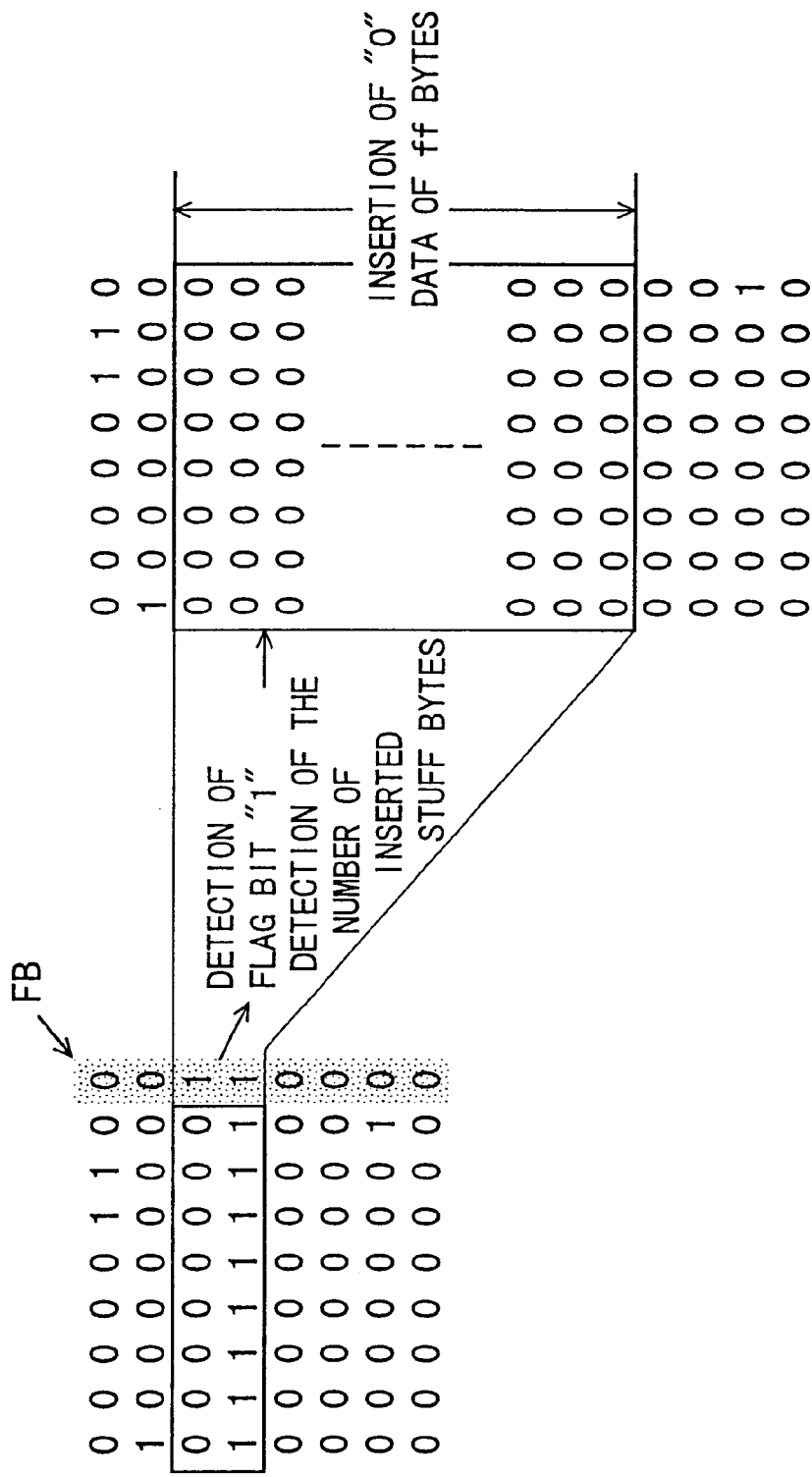
FIG. 11 is an illustration showing an example of detailed operations of a bit stream reforming section according to the third embodiment of the present invention.

FIG. 11 is an illustration schematically representing operations of a bit stream reforming section in the third embodiment of the present invention. In FIG. 11, when the flag bit FB is "1," a stuff code at the corresponding position is decoded and the number of stuff bytes to be inserted is detected. Transfer of coded data is prohibited and stuff bytes of the number indicated by the stuff code are generated to be inserted into the bit stream. In FIG. 11, "0" data of FF bytes are inserted. Therefore, only by monitoring flag bit FB, an insertion position of stuff bytes can be identified with ease and an effect similar to the first embodiment can be achieved.

Figure 12:
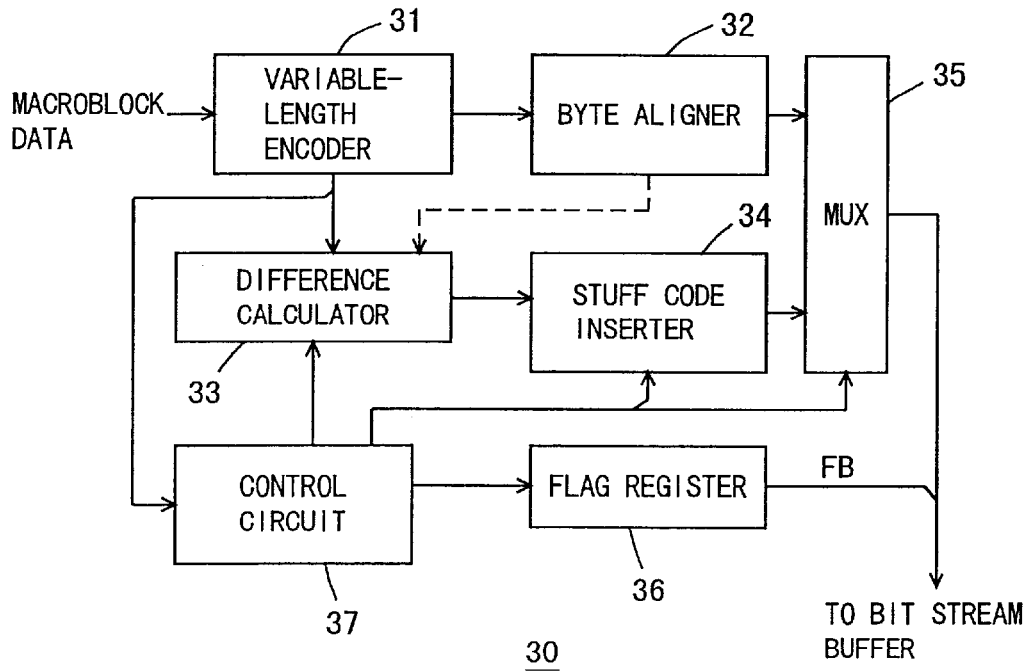
FIG. 12 is a block diagram showing a configuration of a bit stream generation section according to the third embodiment of the present invention in a simple and concise manner.

FIG. 12 is a block diagram showing a configuration of a bit stream generation section 30 of an image signal coding apparatus according to the third embodiment of the present invention. In FIG. 12, the bit stream generation section 30 includes: a variable-length encoder 31 converting a macroblock data (quantized DCT coefficients) to variable-length codes; a byte aligner 32 performing byte alignment of output codes of the variable-length encoder and filling with "0" when byte alignment is performed; a difference calculator 32 accumulating the number of code bits from the variable-length encoder 31 and calculating a difference from a target (stored in a register not shown) in byte units; a stuff code inserter 34 generating a stuff code indicating the number of stuff bytes to be inserted according to difference information from the difference calculator 33; a flag register 36 storing a flag FB; and a control circuit 37 not only activating operations of the difference calculator 33 and the stuff code inserter 34 and setting a connection route of a multiplexer (MUX) 35, but also determining a flag value of the flag register 36 when a processing unit section (a slice, a picture or the like) is terminated according to output bits from the variable-length encoder 31.

The multiplexer 35 selects a coded data from the byte aligner 32 when coded data is outputted and selects a stuff code from the stuff code inserter 34 when a stuff byte is inserted, under control of the control circuit 37. The flag FB from the flag register 36 is provided to the bit stream buffer in parallel to a bit stream selected by the multiplexer 35.

The control circuit 37 sets a flag FB output from the flag register 36 to "1" when one unit processing section is completed according to an output from the variable-length encoder 31. Further, the difference calculator 33 accumulates the number of coded bits from the variable-length encoder 31 and calculates a difference from a target. The stuff code inserter 34 generates a stuff code according to difference information from the difference calculator 33. The flag FB from the flag register 36 is transferred on an internal bus in synchronization with a coded data and a stuff code from the multiplexer 35, to be supplied to the bit stream buffer.

It should be noted that, in the configuration shown in FIG. 12, the byte aligner 32 performs alignment of data of the variable-length encoder 31 and inserts "0" into an empty space. In this configuration, the difference calculator 33 may accumulate output bytes of the byte aligner 32 and calculates a difference from a target. This operation route is indicated with a broken line in FIG. 12.

Further, such a configuration may be adopted that the stuff code inserter 34 is activated when the byte aligner 32 fills with "0," and encodes an output from the difference calculator 33.

It should be noted that, in the bit stream generation section 30 shown in FIG. 12, the byte aligner 32 may function so as to generate byte data with a flag and a code in addition to coded data on which byte alignment is performed using a bit fixed at "0" previously as flag FB, the stuff code inserter 34 may function so as to generate a stuff code with a flag using a fixed value at "1" as flag FB, when the stuff code is generated and, the multiplexer 35 may select one of outputs of the byte aligner 32 and the stuff code inserter 34.

Figure 13:
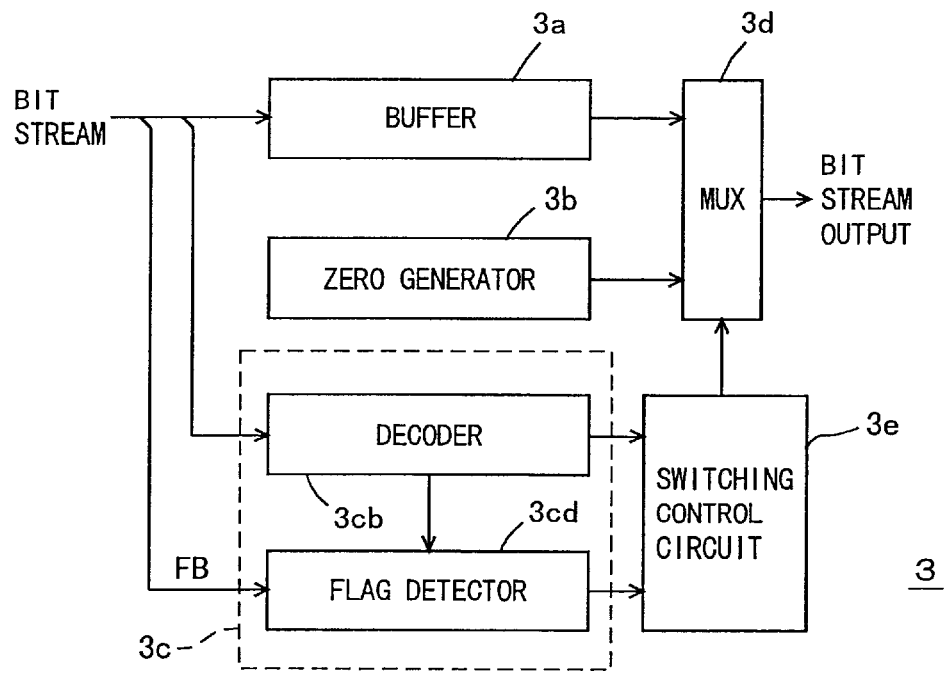
FIG. 13 is a block diagram schematically showing a configuration of the bit stream reforming section according to the third embodiment of the present invention.
Figure 14:
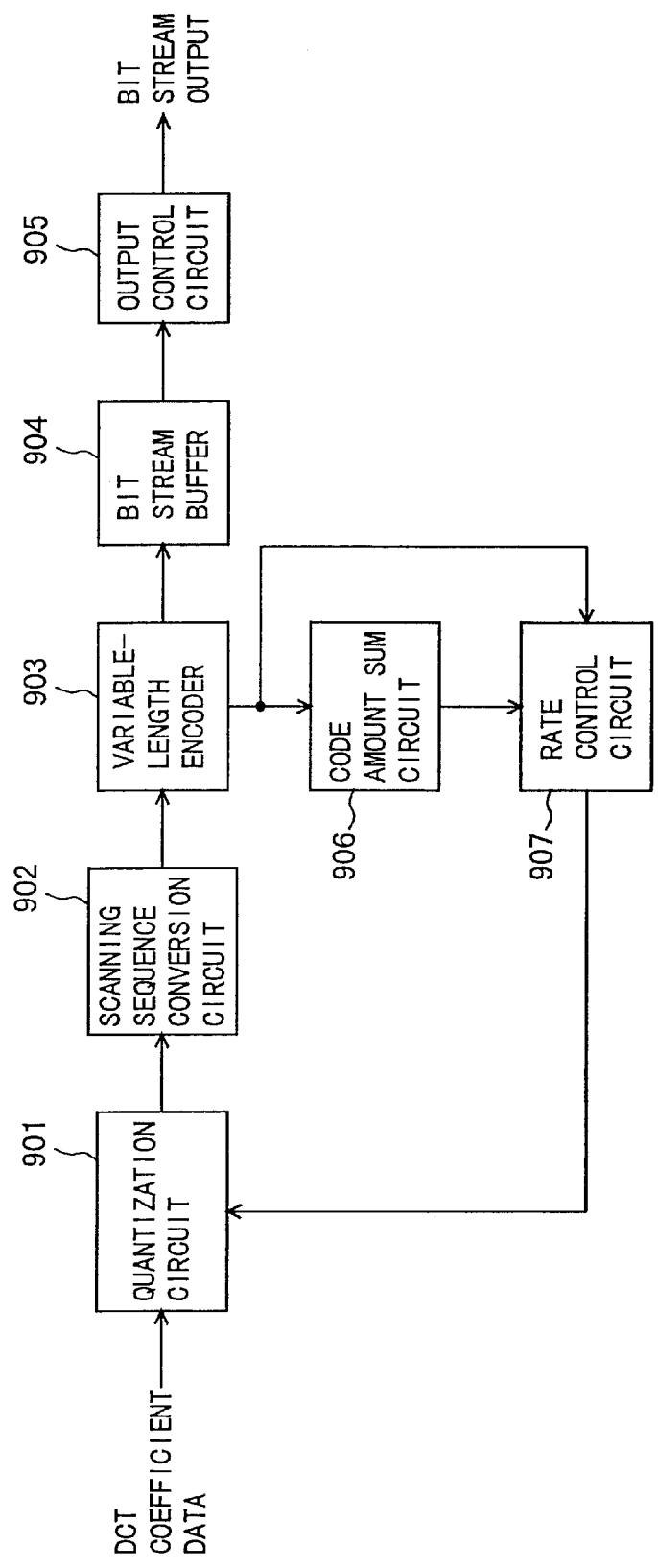
FIG. 14 is an illustration schematically showing a configuration of a conventional image signal coding apparatus.
Figure 15A:
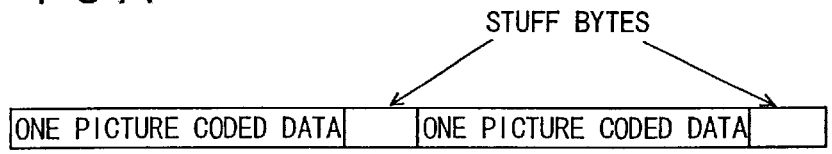
FIGS. 15A and 15B are illustrations showing an example of an amount of stuff bytes of a conventional image signal coding apparatus.
Figure 15B:
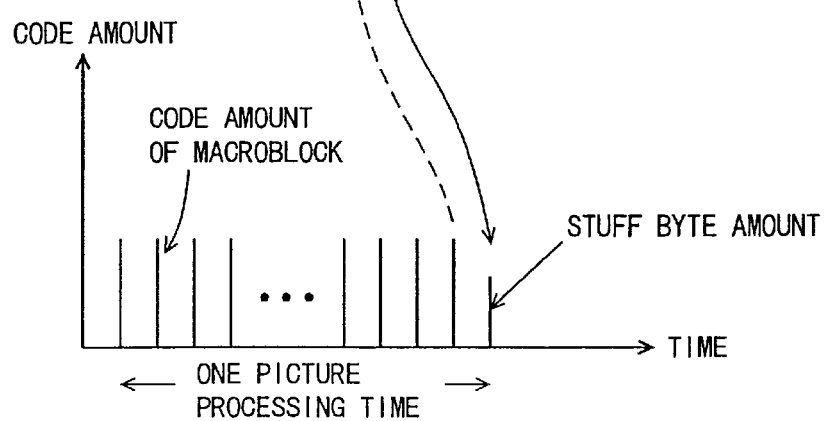
Figure 16A:
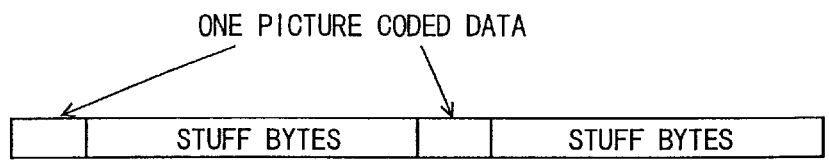
FIGS. 16A and 16B are illustrations showing another example of an amount of stuff bytes of a conventional image signal coding apparatus.
Figure 16B:
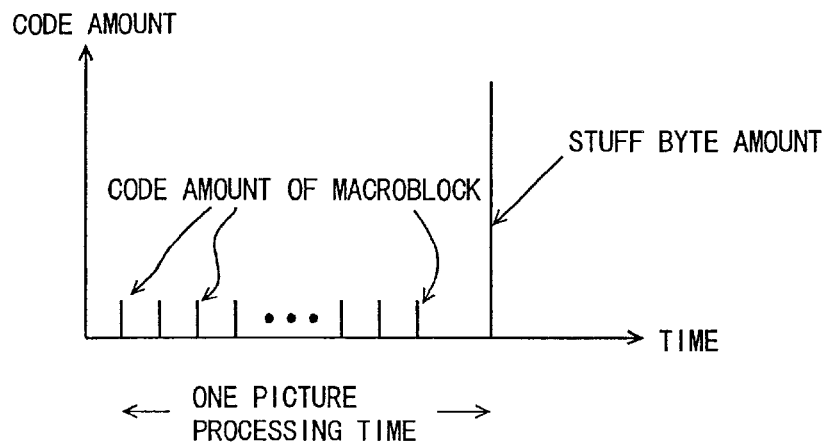

FIG. 13 is a block diagram schematically showing a configuration of the bit stream reforming section according to the third embodiment of the present invention. In the configuration of the bit stream reforming section 3 shown in FIG. 13, a flag detector 3cd is used instead of the code detector 3ca shown in FIG. 6. The other configuration is the same as in FIG. 6, corresponding constituents are attached by the same reference numbers as in FIG. 6 and detailed descriptions thereof are omitted.

In the configuration of the bit stream reforming section 3 shown in FIG. 13, the flag FB is provided to the flag detector 3cd from a bit stream read out from the bit stream buffer. When the flag FB is "1," the flag detector 3cd provides a stuff code detection signal to the switching control circuit 3e and makes the multiplexer 3d select an output of the zero generator 3b. When the flag detector 3cd detects a stuff byte flag (the flag FB is "1"), the buffer 3a ceases read of a coded data from the bit stream buffer. When the flag detector 3cd detects a stuff byte flag (the flag FB is "1"), the decoder 3cb decodes a stuff code provided to the bit stream, provides a stuff byte indicating signal to the switching control circuit 3e during a period of stuff bytes to be inserted and makes the multiplexer 3d select a "0" byte data from the zero generator. When or before a period of inserting the stuff byte expires, decoder 3cb makes the buffer 3a start read of a next coded data. When insertion of a stuff byte to be inserted is completed, the switching control circuit 3e makes the multiplexer 3d select a coded data output form the buffer 3a.

Therefore, in the bit stream reforming section, the flag detector 3cd only detects "0" and "1" of flag FB, thereby making a circuit configuration simply and concise.

As described above, according to the third embodiment of the present invention, such a configuration is adopted that a stuff byte inserting position and a stuff code insertion position are identified using flags and the stuff code inserting position can be easily identified with a simple and easy circuit configuration, realizing a simple circuit configuration. Further, an effect similar to the first embodiment can be achieved.

It should be noted that the configuration of the image signal coding apparatus according to the third embodiment of the present invention shown in FIGS. 12 and 13 can be used in combination with the second embodiment.

As a processing unit section, in the above example, a slice or a picture is described. However, if there are available layers in which a stuff byte can be inserted, any of the layers may be used as a processing unit section.

As described above, according to the present invention, a stuff code indicating the number of stuff bytes to be inserted is stored in a bit stream buffer instead of the stuff bytes and the stuff bytes can be virtually stored in the bit stream buffer at a constant rate, independent of a magnitude of the number of stuff bytes and there causes no need to increase a transfer capability of a memory, thereby enabling transfer of a bit stream at a constant rate while reliably inserting the stuff bytes.

Further, a transmission control coded data and a stuff byte information stored in a bit stream memory are extracted using addition/subtraction circuitry and there can be performed control of a generated code amount same as a scheme in which stuff bytes are actually stored in the bit stream memory.

Further, when a stored amount of a bit stream memory is calculated, a data bit amount of a stuff start code and a data bit amount of a difference code are subtracted from a stored amount, and thus a data amount stored in the bit stream memory can be correctly calculated and a correct control of a generated code amount can be made.

Further, by using a flag as a stuff start code, a position of the stuff code and a inserting position of stuff bytes can be detected with ease.

Further, byte alignment is applied to each of processing unit sections of a bit stream to link each data with a flag, and a stuff code is set with a flag, whereby the number of stuff bytes to be inserted can be easily detected in byte units and a stuff byte inserting position can also be identified with ease.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image signal coding apparatus comprising:
   bit stream generation circuitry for coding an image signal to generate a bit stream of coded image data;
   difference detection circuitry calculating a number of bits of coded image data for each predetermined processing unit section of the bit stream from said bit stream generation circuitry and obtaining a difference between the calculated number of bits and a predetermined reference number of bits;
   insertion circuitry generating a difference code indicating the difference detected by said difference detection circuitry and a stuff start code indicating an inserting position of said difference code, and outputting the bit stream to a bit stream memory after inserting the difference code and the stuff code into the processing unit section of the bit stream;
   output circuitry extracting said stuff start code and said difference code from the bit stream read out from said bit stream memory and inserting stuff bits by a number indicated by said difference code into a corresponding processing unit section, starting at a position indicated by said stuff start code, to generate and output a multiplexed bit stream;
   addition circuitry adding an amount of data bits written in said bit stream memory and an amount of data bits indicated by said difference code; and
   subtraction circuitry subtracting an amount of stuff bits inserted by said output circuitry from an output value of said addition circuitry, when the difference code is extracted by said output circuitry, to generate information indicating an amount of virtual storage data of said bit stream memory.

2. The image signal coding apparatus according to claim 1, wherein said subtraction circuitry further comprises a circuit subtracting amounts of data bits of said difference code and said stuff start code from the output value of said addition circuitry.

3. The image signal coding apparatus according to claim 1, wherein said stuff start code is a flag linked to said difference code.

4. An image signal coding apparatus comprising:
   bit stream generation circuitry for coding an image signal to generate a bit stream of coded image data;
   difference detection circuitry calculating a number of bits of coded image data for each predetermined processing unit section of the bit stream from said bit stream generation circuitry and obtaining a difference between the calculated number of bits and a predetermined reference number of bits;
   insertion circuitry generating a difference code indicating the difference detected by said difference detection circuitry, outputting the coded image data with a flag of a first logic state linked thereto, to a bit stream memory, in a unit of a predetermined number of bits in parallel and outputting said difference code with a flag of a second logic state different from the first logic state linked thereto, to the bit stream memory, in the unit of the predetermined number of bits in parallel; and
   output circuitry extracting said difference code according to said flag from the bit stream read out from said bit stream memory and inserting stuff bits by a number indicated by said difference code into a corresponding processing unit section, starting at a position indicated by said flag.

5. An image signal coding apparatus comprising:
   bit stream generation circuitry for coding an image signal to generate a bit stream of coded image data;
   difference detection circuitry calculating a number of bits of said coded image data for each predetermined processing unit section of the bit stream from said bit stream generation circuitry and obtaining a difference between the calculated number of bits and a predetermined reference number of bits;
   insertion circuitry generating a difference code indicating the difference detected by said difference detection circuitry and a stuff insert position indicating code indicating an inserting position of the difference code and generating a multiplexed bit stream by inserting said difference code and said stuff insert position indicating code into a corresponding processing unit section of the bit stream to output said multiplexed bit stream;
   a bit stream memory for storing a bit stream generated by said insertion means;
   output circuitry extracting said stuff insert position indicating code and said difference code from the bit stream read out from said bit stream memory and inserting stuff bits by a number indicated by said difference code into a corresponding processing unit section, starting at a position indicated by said stuff insert position indicating code.

6. The image signal coding apparatus according to claim 5, further comprising:
   an accumulation amount calculation circuit calculating a value relating to an accumulation amount of data in accordance with an amount of data bits written in said bit stream memory, an amount of data bits indicated by said difference code, and an amount of stuff bits inserted by said output circuitry; and
   a code amount control circuit adjusting a code amount of the bit stream based on the value calculated by said accumulation amount calculation circuit.

7. The image signal coding apparatus according to claim 6, further comprising a quantization circuit quantizing data relating to an image in accordance with an quantizing scale adjusted by said code amount control circuit, to generate the image data to be supplied to the bit stream generation circuit.

8. The image signal coding apparatus according to claim 6, further comprising a quantization circuit quantizing DCT coefficient data to generate the image data to be supplied to the bit stream generation circuit, wherein said code amount control circuit controls to generate the DCT coefficient data.

9. The image signal coding apparatus according to claim 6, wherein said accumulation amount calculation circuit performs an arithmetic operation of the amount of data bits written in said bit stream memory plus the amount of data bits indicated by said difference code minus the amount of stuff bits inserted by said output circuitry.

10. The image signal coding apparatus according to claim 6, wherein an arithmetic operation of the amount of data bits written in said bit stream memory plus the amount of data bits indicated by said difference code minus a size of the difference code minus a size of the stuff start code minus the amount of stuff bits inserted by said output circuitry.

11. The image signal coding apparatus according to claim 5, wherein said stuff start code is flags respectively linked to first portions into which the coded image data is grouped and second portions into which the difference code is grouped, said first and second portions each having a same bit size.

* * * * *